United States Patent Office 3,700,506
Patented Oct. 24, 1972

3,700,506
METHOD FOR REDUCING AN IRON LOSS OF AN ORIENTED MAGNETIC STEEL SHEET HAVING A HIGH MAGNETIC INDUCTION
Osamu Tanaka and Fumio Matsumoto, Kitakyushu, Japan, assignors to Nippon Steel Corporation, Tokyo, Japan
No Drawing. Filed Dec. 9, 1969, Ser. No. 883,614
Claims priority, application Japan, Dec. 10, 1968, 43/90,427
Int. Cl. H01f 1/18
U.S. Cl. 148—111                                                    2 Claims

ABSTRACT OF THE DISCLOSURE

A process for reducing an iron loss of an oriented magnetic steel sheet having a high magnetic induction by subjecting a decarburizing annealing, thereupon coating the thus annealed steel sheet with an annealing separator, to which B and S or Se are added, and then finally annealing the steel sheet.

BACKGROUND OF THE INVENTION

Field of the invention

The present invention relates to a process for improving an iron loss of an oriented magnetic steel sheet having a high magnetic induction.

An oriented magnetic steel sheet having a high magnetic induction can be manufactured by treating a steel, in which AlN and sulfide coexist, as is shown in the invention disclosed in the specification of U.S. Pat. 3,287,183. The magnetic characteristics required of an oriented electric iron sheet are a high magnetic induction and a low iron loss. The iron loss is an important characteristic influencing the efficiency of a transformer, generator or motor and electric iron sheets are usually classified in quality according to this iron loss. The present invention is to meet the requirement of reducing an iron loss in an oriented magnetic steel sheet having a high magnetic induction.

Description of the prior art

As factors influencing above-mentioned iron loss, there are mentioned the thickness, specific resistance, impurity, orientation and crystal granularity of the iron sheet. It has been, however, discovered that, besides above-mentioned factors, an oriented steel sheet having a high magnetic induction is largely influenced by a glassy film formed on the surface of the steel sheet when subjected to the final annealing. That is, when subjecting the steel sheet to the final box annealing while using an annealing separator, to which B or B-containing compound is added, a part of B added to the annealing separator diffuses into the steel and forms boride in the steel, which is assumed to prevent the growth of secondary grains and keep secondary grain size small, whereby eddy current is prevented from being increased, and further another part of B beyond that part of B diffused into the steel has a function of forming a uniform thin glassy film, whereby the iron loss is reduced.

With regard to the effects of B the same inventors have disclosed an invention, for which a patent protection has been claimed in another application. However, it has been found out that sufficient effects of B can not always be secured by only adding B or B-compound to an annealing separator, because an oxidized film is formed on the surface of a decarburized steel sheet, whereby the diffusion of B into the steel and the formation of a uniform glassy film are often impaired.

SUMMARY OF THE INVENTION

An object of the present invention is to provide an oriented magnetic steel sheet having a high magnetic induction and a low iron loss by causing B added to an annealing separator to be coated on the surface of the steel sheet, when subjecting the steel sheet to the final annealing, to function stably and sufficiently.

Another object of the present invention is to provide an oriented magnetic steel sheet having a high magnetic induction by making secondary grains adequately small and stabilizing the uniform formation of a glassy film on the surface of the steel sheet.

Still other objects of the present invention will be made clear with reference to the following description.

A means for achieving the above-mentioned objects of the present invention resides in that a steel sheet of a final gauge prepared from a steel containing less than 4.0% Si and a small amount of acid-soluble Al, preferably in a range of 0.010 to 0.065%, according to the method as will be later described, is coated with an annealing separator, to which B or B-compound and in addition thereto at least one selected from the group consisting of S, Se and their compounds are added, and then subjected to the final annealing. In this case the addition of S or Se stabilizes sufficiently the function of B and extends its effect on an average to all parts of the steel sheet.

DESCRIPTION OF THE PREFERED EMBODIMENTS

As examples of using S or Se, there are U.S. Pats. 3,333,991, 3,333,992 and 3,333,993 to be referred to. All these references relate, however, to a method, wherein S or Se is diffused into primary grain boundaries from the surface of a steel sheet, which has been reduced to a final gauge by rolling and then subjected to a decarburizing annealing, to restrain the growth of primary grains, whereby secondary recrystallization is to be induced.

In the case of an oriented magnetic steel sheet having a high magnetic induction as the material of the present invention, it is a requisite condition to induce secondary recrystallization by means of AlN, S, Se, Te and the like added into a molten steel. According to the descriptions of the above mentioned U.S. patent specifications the addition of S or Se is to induce secondary recrystallization as above-mentioned. In the case of the present invention, however, the addition of S or Se is to assist the function of B, but not to have influence on inducing secondary recrystallization.

The functions of S or Se coexisting with boron are thought to be the following two. One is to positively accelerate and secure the diffusion of boron into the steel. On the surface of a silicon steel sheet after decarburizing annealing there is formed a layer of oxides of Si, Fe and the like. As the annealing separator containing boron is applied on this oxide layer, boron diffuses into the steel through this oxide layer and the diffusion of boron into the steel is greatly obstructed by the thickness of this oxide. S, Se or $H_2S$ or $H_2Se$, which is produced by the combination with hydrogen in the atmosphere, reacts with such oxides and makes the layer of the oxides thin, whereby boron can easily diffuse into the steel.

The other function of S or Se is to make the glassy film after the final annealing thin and uniform. The layer of the oxides after the decarburizing annealing and the annealing separator react with each other to form a glassy film at the time of the final annealing. In the case of the conventional oriented silicon steel sheet the effects of the glassy film are expected in achieving the insulation resistivity and the reduction of the magnetostriction.

Now, it has been discovered that in the case of an oriented steel sheet having a high magnetic induction this glassy film exerts a great influence on the iron loss. That is, in the case of an ordinary oriented silicon steel sheet there is perceived substantially no difference in the iron loss, whether such a glassy film is present or not, but in the case of an oriented steel sheet having a high magnetic induction the iron loss shows a remarkably unfavorable value, if there exists no glassy film. This indicates that the mechanism of the glassy film of an oriented steel sheet having a high magnetic induction differs largely from that of an ordinary oriented silicon steel sheet, in other words, in the case of the former steel sheet the orientation of secondary recrystallization is very close to (110)[001], which means that secondary nuclei are strictly selected at the time when secondary recrystallization are generated. Only nuclei, which are close to (110) [001], are permitted to grow to secondary grains. For this reason, a steel sheet having a high magnetic induction has in general grains of large size as compared with a usual oriented silicon steel sheet. Consequently, the iron loss due to the eddy current loss is large and the total iron loss is worsened. On the other hand, the glassy film gives a tension on the steel due to the difference in the thermal expansion rate between the glassy film and the steel sheet and by this tension the iron loss of the oriented steel sheet having a high magnetic induction can remarkably be reduced. This is a phenomenon resulting from the fact that in the case of an oriented steel sheet having a high magnetic induction the crystal orientation corresponds exactly to (110)[001], while in the case of an ordinary oriented silicon steel sheet there is caused no effect in improving the iron loss, or rather sometimes unfavorable effect by the presence of the glassy film.

The glassy film having such important action on the iron loss as above mentioned must be uniform and thin and must be that which can give a strong tension on the steel. When boron is added to the annealing separator, there can be obtained glassy film which meets such requirements. However, there occur practically following situations. That is, the oxidized layer on the surface of the steel sheet after the decarburization is not always uniform. Further, depending upon the amount of moisture contained in the final annealing atmosphere there may be produced such a glassy film as is accompanied with a partly thick sub-scale or no glassy film at all. When S or Se is added then into the separator simultaneously with boron, $H_2S$ or $H_2Se$ produced by the reaction of S or Se with $H_2$ contained in the separator or in the annealing atmosphere, may remove excess oxides and a thin uniform oxide layer may be produced. Correspondingly, also the glassy film to be produced by the reaction of the separator with the above-mentioned oxide layer may be thin and uniform. Moreover, as there is also an oxide of boron, a glassy film may be formed at a comparatively low temperature, the diffusion of S or Se into the steel may be obstructed and the deterioration of the orientation many be prevented. Consequently, a product of a low iron loss may be obtained without causing the lowering of the magnetic induction.

The above are thought to be the effects obtained by the composite action of boron and S or Se.

In the following the particulars of the present invention shall be explained.

The conditions of melting, casting, rolling and annealing a material as the starting material of the present invention and the composition thereof are limited of itself on account of the present invention being applied to a steel sheet having a high magnetic induction only. The conditions of manufacturing an oriented steel sheet having a high magnetic induction are shown, for instance, in U.S. Pat. 3,287,183, wherein the oriented steel sheet consists of less than 4.0% silicon, 0.010 to 0.065% acid-soluble Al, less than 0.085% C, 0.005 to 0.05% S and the rest being iron and unavoidable impurities.

The ingot which is made a slab by blooming after being cast or which is cast into a slab is made a hot-rolled coil by continuous hot-rolling. The hot-rolled coil is made the final gauge by one or more cold-rolling. In the case of one cold-rolling, the cold-rolling reduction rate is made 81 to 95% and in the case of two or more cold-rollings the final cold-rolling reduction rate is made 81 to 95%, after intermediate annealing which is carried out one or more times. In any case of carrying out either one or more cold-rollings, the sheet is to be annealed in a temperature range of 1,000 to 1,200° C. for 30 seconds to 10 minutes after the hot-rolling or between the cold-rollings, so than AlN may be precipitated. After this annealing for precipitation, if necessary, if may be quenched from the temperature range of 750 to 950° C. down to 400° C. during 2 to 200 seconds depending on the contents of C and Si. The steel sheet made to be of the final thickness by the final cold-rolling should be made to have a carbon content of less than 0.005% by the decarburizing annealing.

The surface of the steel sheet after the decarburization is coated with an annealing separator to prevent the steel sheet from sticking by burning in the final annealing. For the annealing separator can be used any one or a combination of any of MgO, CaO, $Al_2O_3$ and $TiO_2$. However, as the steel sheet as the starting material of the present invention contains Al which is oxidized to form $Al_2O_3$ at the time of annealing and hinders the formation of a glassy film, it is desirable to use a separator, wherein Ti compound and Mn compound are added to MgO. When using the said separator the glassy film can be formed without being hindered by the presence of $Al_2O_3$. To the annealing separator there are added B or a B compound in order to improve the iron loss and further S (or S compound) or Se (or Se compuond) in order to assist the function of B. B or a B compound is added in the form of a powder or an aqueous solution to the annealing separator. With the addition of less than 0.01% B, no effect can be recognized. On the other hand, the addition of more than 2% B is not desirable, as the development of secondary recrystallization is influenced thereby and an oriented steel sheet having a high magnetic induction can not be obtained.

For an amount of B to be added the range of 0.05 to 0.5% has been proved to be the most preferable. S (or S compound) or Se (or Se compound), which is added to assist the function of B, is added mainly in the form of a powder to the separator. However, with less than 0.05% S or Se, no effect can be recognized. But, the addition of more than 5% is not desirable, because secondary recrystallization is influenced thereby and there is obtained only an oriented steel sheet low in a magnetic induction. Therefore, the preferable addition of S or Se resides in the range of 0.5 to 4%.

The final annealing should be carried out at temperature and for time sufficient for (110)[001] secondaries to well develop and for impurities to vanish due to the purification. For this purpose, it is necessary to anneal the sheet above 1,000° C. for more than 5 hours in an atmosphere of hydrogen or nitrogen.

EXAMPLE 1

A silicon steel containing 0.046% C, 2.95% Si, 0.031% Al and 0.025% S was bloomed and hot-rolled to be 2.5 mm. thick, was then continuously annealed at 1,130° C. for 2 minutes and was then pickled. Then, the steel sheet was cold-rolled to be of a final sheet thickness of 0.23 mm. and was annealed to be decarburized in a wet hydrogen atmosphere at 850° C. for 2 minutes. This steel sheet was coated with two kinds of annealing separator prepared by adding 10 parts by weight of $TiO_2$ and 5 parts by weight of $MnO_2$ to 100 parts by weight of MgO and in addition thereto 0.1 to 3% boric acid, the one of which separator having a further addition of 2% S and the other having no addition of S respectively and then annealed at 1,200° C. for 20 hours.

Further, for the sake of comparison, the same material was coated with a separator, which had been prepared by using only MgO and to which 2% S had been added, and was final-annealed in the manner according to the method disclosed in U.S. Pat. 3,333,991. The results of measuring the magnetic characteristics of the samples are shown in Table 1.

and adding thereto 1% boric acid and 0, 1, 3, 5 or 10% S and was final-annealed at 1,200° C. for 20 hours. The results of magnetic characteristics of the samples after the annealing are shown in Table 2.

TABLE 2

| Amount of addition of boric acid, percent | Amount of addition of sulfur, percent | $W_{15/50}$ | | | | $W_{17/50}$ | | | | $B_{10}$ | | | |
|---|---|---|---|---|---|---|---|---|---|---|---|---|---|
| | | Min. | Max. | Average | R | Min. | Max. | Average | R | Min. | Max. | Average | R |
| 1.0 | 0 | 0.76 | 0.89 | 0.83 | 0.13 | 1.06 | 1.21 | 1.18 | 0.15 | 19.15 | 19.51 | 19.33 | 0.36 |
| 1.0 | 1 | 0.76 | 0.82 | 0.77 | 0.06 | 1.04 | 1.15 | 1.07 | 0.11 | 19.10 | 19.48 | 19.35 | 0.38 |
| 1.0 | 3 | 0.76 | 0.81 | 0.77 | 0.05 | 1.04 | 1.11 | 1.06 | 0.07 | 19.21 | 19.48 | 19.37 | 0.27 |
| 1.0 | 5 | 0.78 | 0.85 | 0.80 | 0.07 | 1.09 | 1.19 | 1.12 | 0.10 | 18.83 | 19.25 | 19.00 | 0.42 |
| 1.0 | 10 | 0.87 | 1.01 | 0.96 | 0.14 | 1.26 | 1.47 | 1.41 | 0.21 | 18.36 | 18.58 | 18.44 | 0.22 |

As a result, it is shown that, the same as in Example 1, by the addition of S, the iron loss did not vary in the minimum value but was remarkably reduced in the fluctuation. It is understood that, when the addition of S is more than 5%, the influence on the secondary recrystallization and the $B_{10}$ characteristic become deteriorated.

What is claimed is:

1. In a process for producing a single-oriented silicon steel sheet having a high magnetic induction and a low iron loss, comprising the steps of hot-rolling a slab consisting of less than 4.0% Si, 0.010 to 0.065% acid-soluble Al, less than 0.085% C, 0.005 to 0.05% S, and the balance being unavoidable impurities and Fe to make a hot-rolled steel sheet, subjecting the thus-obtained hot-rolled steel sheet to one cold-rolling or two or more cold-rollings with an intermediate annealing between then to make the final thickness of the steel sheet, wherein the final cold-rolling is carried out at a reduction rate of 81 to 95% and, prior to the final cold-rolling, annealing the steel sheet at a temperature of 1,000 to 1,200° C. for 30 seconds to 10 minutes to cause AlN precipitates

TABLE 1

| Amount of addition of boric acid, percent | Amount of addition of sulfur, percent | $W_{15/50}$ | | | | $W_{17/50}$ | | | | $B_{10}$ | | | | Remarks |
|---|---|---|---|---|---|---|---|---|---|---|---|---|---|---|
| | | Min. | Max. | Average | R | Min. | Max. | Average | R | Min. | Max. | Average | R | |
| 0.0 | 0.0 | 0.73 | 0.88 | 0.78 | 0.15 | 1.09 | 1.28 | 1.13 | 0.19 | 18.85 | 19.25 | 19.05 | 0.40 | Without $TiO_2$ and $MnO_2$. |
| 0.0 | 2.0 | 0.83 | 0.95 | 0.88 | 0.12 | 1.18 | 1.38 | 1.26 | 0.20 | 18.20 | 18.87 | 18.61 | 0.47 | |
| 0.1 | 0.0 | 0.68 | 0.81 | 0.73 | 0.13 | 0.99 | 1.11 | 1.04 | 0.12 | 18.85 | 19.35 | 19.06 | 0.49 | |
| 0.5 | 0.0 | 0.63 | 0.75 | 0.69 | 0.12 | 0.96 | 1.08 | 1.01 | 0.12 | 18.93 | 19.27 | 19.10 | 0.34 | With the addition of $TiO_2$ and $MnO_2$. |
| 1.0 | 0.0 | 0.63 | 0.74 | 0.68 | 0.11 | 0.96 | 1.07 | 1.00 | 0.11 | 18.95 | 19.21 | 19.15 | 0.26 | |
| 3.0 | 0.0 | 0.72 | 0.83 | 0.76 | 0.11 | 1.03 | 1.18 | 1.09 | 0.15 | 18.67 | 19.05 | 18.84 | 0.38 | |
| 0.1 | 2.0 | 0.69 | 0.79 | 0.71 | 0.10 | 1.00 | 1.09 | 1.03 | 0.09 | 18.95 | 19.30 | 19.13 | 0.35 | |
| 0.5 | 2.0 | 0.64 | 0.68 | 0.65 | 0.04 | 0.94 | 1.00 | 0.96 | 0.06 | 19.05 | 19.30 | 19.17 | 0.25 | With the addition of $TiO_2$ and $MnO_2$. |
| 1.0 | 2.0 | 0.64 | 0.69 | 0.66 | 0.05 | 0.95 | 1.01 | 0.98 | 0.06 | 19.03 | 19.31 | 19.20 | 0.28 | |
| 3.0 | 2.0 | 0.69 | 0.75 | 0.71 | 0.06 | 0.99 | 1.08 | 1.04 | 0.09 | 18.84 | 19.28 | 18.97 | 0.44 | |

As understood from these results, in the comparison of the case, in which S was added to the annealing separator containing boric acid, with the case, in which S was not added, it was shown that by the addition of 2% S, the iron loss showed a stabilized value, as the fluctuation thereof was largely reduced, though it did not substantially vary in the minimum value.

Further, it was found that, in case S was added without the addition of boric acid, the iron loss itself was high and also the value of $B_{10}$ was remarkably lowered. The annealing with MgO only showed rather a better result.

EXAMPLE 2

The same material as in Example 1 was treated under exactly the same conditions except that the final thickness was made 0.275 mm. and was then annealed to be decarburized. Then, the steel sheet was coated with an annealing separator prepared by mixing 5 parts of $TiO_2$ and 2.5 parts of $MnO_2$ to 100 parts of MgO by weight in the steel sheet, thereupon subjecting the steel sheet to a decarburizing annealing and a finishing annealing at a temperature of more than 1,000° C., the improvement therein comprising adding a substance selected from the group consisting of boron and boron compounds in an amount of 0.01 to 2.0 wt. percent as boron and further at least one substance selected from the group consisting of sulfur, sulfur compounds, selenium and selenium compounds and mixtures of sulfur or sulfur componds and selenium or selenium compounds in an amount of 0.05 to 5.0 wt. percent as sulfur or selenium into an annealing separating agent, coating the surface of the steel sheet with the annealing separating agent containing boron and sulfur, or selenium, or mixtures thereof on the surface of the steel sheet and subjecitng the thus-coated steel sheet to a finishing annealing.

2. The process according to claim 1, wherein a mixture containing a Ti compound and an Mn compound added to MgO is used as the annealing separator.

(References on following page)

References Cited

UNITED STATES PATENTS

| | | | |
|---|---|---|---|
| 3,583,887 | 6/1971 | Steger et al. | 148—31.55 X |
| 3,522,108 | 7/1970 | Yamamoto et al. | 117—129 X |
| 3,151,000 | 9/1964 | Schmidt et al. | 148—113 X |
| 3,157,538 | 11/1964 | Imai et al. | 148—110 X |
| 3,159,511 | 12/1964 | Taguchi et al. | 148—113 X |
| 3,207,636 | 9/1965 | Wada et al. | 148—113 X |
| 3,287,183 | 11/1966 | Taguchi et al. | 148—111 |
| 3,333,993 | 8/1967 | Kohler | 148—113 |
| 3,477,881 | 11/1969 | Wada et al. | 148—113 X |

FOREIGN PATENTS 407,663  4/1965  Japan.

L. DEWAYNE RUTLEDGE, Primary Examiner

G. K. WHITE, Assistant Examiner

U.S. Cl. X.R.

117—129; 148—6.24, 12.1, 27, 113, 122